United States Patent
Werner et al.

(10) Patent No.: US 9,614,674 B2
(45) Date of Patent: Apr. 4, 2017

(54) VIRTUAL BANDS CONCENTRATION FOR SELF ENCRYPTING DRIVES

(71) Applicant: Seagate Technology LLC, Cupertino, CA (US)

(72) Inventors: Jeremy Werner, San Jose, CA (US); Leonid Baryudin, San Jose, CA (US)

(73) Assignee: Seagate Technology LLC, Cupertino, CA (US)

(\*) Notice: Subject to any disclaimer, the term of this patent is extended or adjusted under 35 U.S.C. 154(b) by 55 days.

(21) Appl. No.: 14/817,589

(22) Filed: Aug. 4, 2015

(65) Prior Publication Data

US 2015/0341171 A1 Nov. 26, 2015

Related U.S. Application Data (63) Continuation of application No. 14/033,753, filed on Sep. 23, 2013, now Pat. No. 9,117,086.

(60) Provisional application No. 61/870,936, filed on Aug. 28, 2013.

(51) Int. Cl.
| | |
|---|---|
| *H04L 9/08* | (2006.01) |
| *G06F 21/60* | (2013.01) |
| *G06F 21/62* | (2013.01) |

(52) U.S. Cl.
CPC .......... *H04L 9/0897* (2013.01); *G06F 21/602* (2013.01); *G06F 21/6218* (2013.01); *H04L 9/0877* (2013.01)

(58) Field of Classification Search
CPC . H04L 9/0897; H04L 9/0877; G06F 21/6218; G06F 21/602
See application file for complete search history.

(56) References Cited

U.S. PATENT DOCUMENTS

| | | | |
|---|---|---|---|
| 2004/0117590 A1 | 6/2004 | Arimilli et al. | 711/203 |
| 2009/0282266 A1 | 11/2009 | Fries et al. | 713/193 |
| 2010/0174922 A1 | 7/2010 | Johnson et al. | 713/193 |
| 2010/0306468 A1 | 12/2010 | Shionoya | 711/114 |
| 2011/0087898 A1\* | 4/2011 | Williams | G06F 21/31 713/193 |
| 2012/0124391 A1 | 5/2012 | Aono | 713/189 |
| 2012/0144209 A1 | 6/2012 | Kahler et al. | 713/193 |
| 2012/0239943 A1\* | 9/2012 | Okamoto | G06F 21/6218 713/193 |
| 2013/0027802 A1 | 1/2013 | Kim | 360/49 |

(Continued)

*Primary Examiner* — Matthew Smithers
(74) *Attorney, Agent, or Firm* — Christopher P. Maiorana, PC (57) ABSTRACT

An apparatus includes a storage medium with an opaque key storage and a controller. The controller may be coupled to the storage medium. The controller may be configured to (i) receive from a host device an authentication key, a plurality of I/O requests, and respective virtual media encryption keys associated with a number of the I/O requests, (ii) allow the host device to access the opaque key storage in response to the authentication key received from the host device being authenticated, (iii) generate a first media encryption key for a real band based upon the authentication key from the host device and key material stored on the apparatus, and (iv) generate a number of second media encryption keys for the number of I/O requests based on the first media encryption key and each of the respective virtual media encryption keys associated with each of the number of I/O requests.

20 Claims, 6 Drawing Sheets

(56) References Cited

U.S. PATENT DOCUMENTS

| | | | |
|---|---|---|---|
| 2013/0067242 A1 | 3/2013 | Lyakhovitskiy et al. | 713/193 |
| 2013/0262795 A1 | 10/2013 | Aono et al. | 711/155 |
| 2014/0075098 A1 | 3/2014 | Uno | 711/103 |
| 2014/0101455 A1* | 4/2014 | Bauman | G06F 21/80 713/189 |
| 2015/0121088 A1* | 4/2015 | Baryudin | G06F 12/1408 713/193 |

* cited by examiner

VIRTUAL BANDS CONCENTRATION FOR SELF ENCRYPTING DRIVES

This application relates to U.S. Ser. No. 14/033,753, filed Sep. 23, 2013, which relates to U.S. Provisional Application No. 61/870,936, filed Aug. 28, 2013, each of which are hereby incorporated by reference in their entirety.

FIELD OF THE INVENTION

The invention relates to storage systems generally and, more particularly, to a method and/or apparatus for implementing virtual bands concentration for self encrypting drives.

BACKGROUND

Self encrypting drives (SEDs) usually employ hardware to encrypt and decrypt user data during write and read operations, respectively. Encryption and decryption are accomplished using a media encryption key (MEK). The MEK is normally a function of logical block address (LBA), where an entire LBA space is subdivided into several LBA ranges (referred to as "data bands" or simply "bands") with a unique MEK for each band. Because of hardware limitations, the number of bands that an SED can support without serious performance degradation is limited (16 would be a reasonably high number). Having more active bands than the number Of LBA ranges supported by hardware will have a negative effect on performance due to constant key swapping. From a perspective of a host in a traditional implementation, user data to which the host has access control under a single authentication key (AK) needs to be contiguously stored in a single LBA range. The single LBA range or band limitation makes it difficult for certain types of applications (like Virtual Machines—VMs) to benefit fully from SED deployment, because VMs might need many (perhaps, thousands) of bands to enable more flexible and efficient usage of the storage device.

It would be desirable to have virtual bands concentration for self encrypting drives.

SUMMARY

The invention concerns an apparatus including a storage medium comprising an opaque key storage and a controller coupled to the storage medium. The controller may be configured to (i) receive from a host device an authentication key, a plurality of I/O requests, and respective virtual media encryption keys associated with a number of the I/O requests, (ii) allow the host device to access the opaque key storage in response to the authentication key received from the host device being authenticated, (iii) generate a first media encryption key for a real band based upon the authentication key from the host device and key material stored on the apparatus, and (iv) generate a number of second media encryption keys for the number of I/O requests based on the first media encryption key and each of the respective virtual media encryption keys associated with each of the number of I/O requests.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing virtual bands concentration (VBC) for self encrypting drives that may (i) implement a virtual band manager (VBM) as part of a virtual machine manager (VMM), (ii) generate media encryption keys on a per input/output (I/O) basis, (iii) support thousands of virtual data bands with hardware encryption/decryption, (iv) facilitate virtual machine migration, (v) enable a crypto erase on a per data band basis, (vi) reduce the number of bands an SED needs to support while still supporting multiple virtual bands on a host side, (vii) concentrate a first number of virtual bands into a significantly smaller second number of real bands, and/or (viii) allow authentication data to be supplied by a host for each read/write operation.

In various embodiments, a method and/or apparatus are provided to generate unique media encryption keys (MEKS) for a plurality of data bands dynamically. The term "data bands" (or simply "bands") generally refers to a range of logical block addresses (LBAs). An entire LBA space is subdivided into several LBA ranges (bands). Each band is associated with a unique MEK. The MEKs are based on authentication information dynamically provided by a host (e.g., as part of "metadata" associated with a user authentication operation). Dynamically generating the MEKs generally refers to a process of creating a new key per each I/O operation. The dynamic generation of MEKS is generally described as "on the fly." In various embodiments, the use of a common authentication key (AK) is allowed across multiple bands to simulate a non-contiguous band of logical block address (LBA) space for host data that needs to be managed with a single authentication key. The key material (e.g., authentication data) is supplied by the host (e.g., a VM Player or VM Manager-VMM, etc.) for each read/write operation, which provides a secure method of enabling thousands (or more) of bands.

Figure 1:
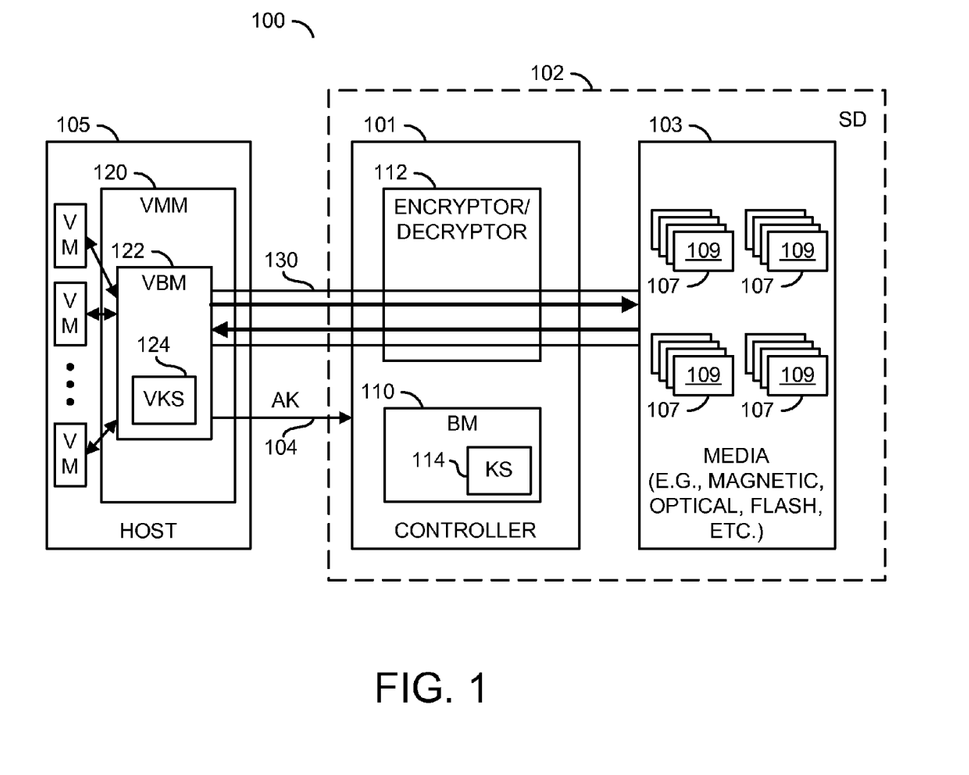
FIG. 1 is a diagram illustrating a system in accordance with an embodiment of the invention.

Referring to FIG. 1, a diagram of a system 100 is shown implementing a virtual bands concentration scheme in accordance with an embodiment of the invention. In various embodiments, the system 100 may be implemented as a self encrypting storage system. In some embodiments, the system 100 comprises a block 101, a block 103, and a block 105. The block 101 comprises a storage controller implementing a band manager and an encryption/decryption circuit in accordance with an embodiment of the invention. The block 103 implements a storage medium. In some embodiments, the block 103 comprises a non-volatile memory (NVM) media (e.g., magnetic memory, FLASH memory, etc.). However, other types of media (e.g., volatile memory with or without battery support) may be implemented accordingly to meet the design criteria of a particular application. Although, with volatile memory, security (and data) would be lost upon power loss. The block 105 comprises a host implementing a virtual memory manager (VMM) in accordance with an embodiment of the invention. The block 101 and 103 are operatively coupled to form a storage device (SD) 102. The SD 102 and the host 105 are configured to be communicatively coupled to each other.

The controller 101 may be configured to control one or more individual memory channels. In some embodiments, the controller 101 may implement multiple memory channel controller instances to control a plurality of memory channels. The controller 101 has a media interface configured to couple the controller 101 to the storage media 103. In non-volatile memory (NVM) embodiments, the storage media 103 may comprises one or more non-volatile memory devices 107. The non-volatile memory devices 107 have, in some embodiments, one or more non-volatile memory targets (e.g., die, disk platter, etc.) 109. According to a type of a particular one of the non-volatile memory devices 107, a plurality of non-volatile memory targets 109 in the particular non-volatile memory device 107 are optionally and/or selectively accessible in parallel. The non-volatile memory devices 107 are generally representative of one type of storage device enabled to communicatively couple to the controller 101. However, in various embodiments, any type of storage device is usable, such as magnetic storage, optical storage, SLC (single level cell) NAND flash memory, MLC (multi-level cell) NAND flash memory, TLC (triple level cell) NAND flash memory, NOR flash memory, electrically programmable read-only memory (EPROM), static random access memory (SRAM), dynamic random access memory (DRAM), magneto-resistive random-access memory (MRAM), ferromagnetic memory (e.g., FeRAM, F-RAM, FRAM, etc.), phase-change memory (e.g., PRAM, PCRAM, etc.), racetrack memory (or domain-wall memory (DWM)), resistive random-access memory (RRAM or ReRAM), or any other type of memory device or storage medium.

In some embodiments, the controller 101 and the non-volatile memory media 103 are implemented on separate integrated circuits (or devices). When the controller 101 and the non-volatile memory media 103 are implemented as separate integrated circuits (or devices), the media interface of the controller 101 is generally enabled to manage a plurality of data input/output (I/O) pins and a plurality of control I/O pins. The data I/O pins and the control I/O pins may be configured to connect the device containing the controller 101 to the external devices forming the non-volatile memory media 103. In various embodiments, the controller 101 is implemented as an embedded controller. In various embodiments, the controller 101 and the NVM media 103 implement a solid state hybrid hard disk drive (SSHD), a hard disk drive (HDD), or a solid-state drive/disk (SSD).

The controller 101 also has a command interface configured to receive commands and send responses to the host 105. In embodiments implementing a plurality of non-volatile memory devices, the controller 101 includes at least one NVM control processor that manages the non-volatile memory devices via proprietary processes, and a host processor that manages the host interface according to other processes. The NVM control processor(s) and the host processor communicate via predefined interfaces. The host processor communicates host commands to the NVM control processor, which processes the commands according to predefined communication interfaces (or protocols). The controller 101 also includes a band manager (BM) 110 and an encryption/decryption (E/D) block (or circuit) 112 configured to implement a virtual bands concentration scheme in accordance with an embodiment of the invention. The band manager 110 includes a key storage (KS) 114 that stores key material (KM) used by the storage device 102. In some embodiments, the key storage 114 may also store virtual key material (VKM) used by the host 105.

The host 105 includes a virtual machine manager (VMM) block 120. The VMM 120 is configured to implement a virtual bands concentration scheme in accordance with an embodiment of the invention. The VMM 120 comprises one or more virtual band managers (VBMs) 122. In some embodiments, the VMM 120 runs a separate VBM 122 instance for each real band. Each VBM 122 includes a virtual key storage (VKS) 124 that stores virtual key material (VKM). Each VBM 122 concentrates a plurality of virtual bands (VBs) into a real band 130 for storage on the SD 102. The plurality of virtual bands received by each VBM 122 are from a number of virtual machines (VMs) running on the host 105 that are associated with each VBM 122 by the VMM 120. A single VBM 122 can manage one or more real bands. Each VBM 122 authenticates itself to the storage device 102 by providing a respective authentication key (AK) 104.

Figure 2:
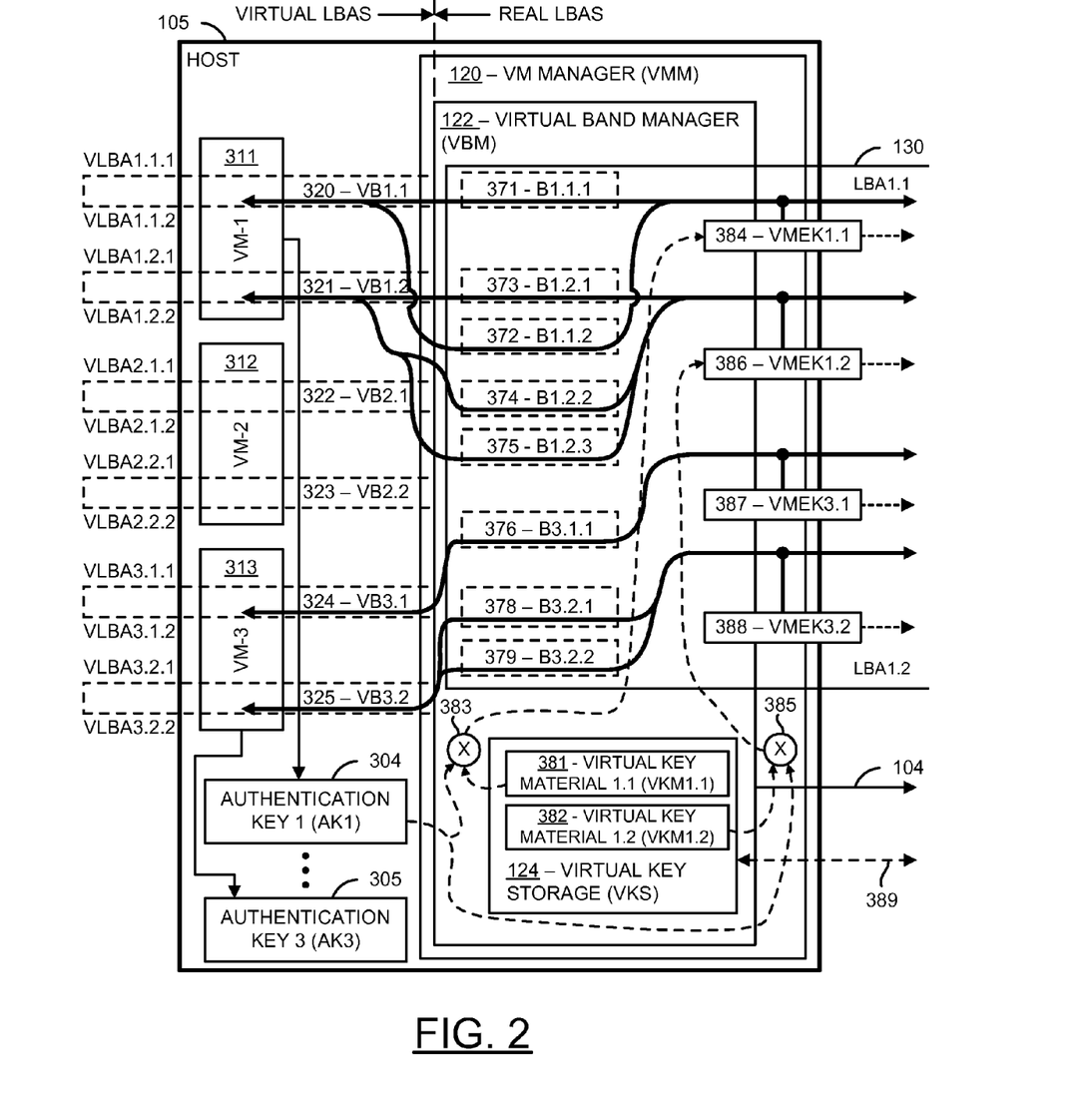
FIG. 2 is a diagram illustrating a host portion of a virtual bands concentrator in accordance with an embodiment of the invention.
Figure 3:
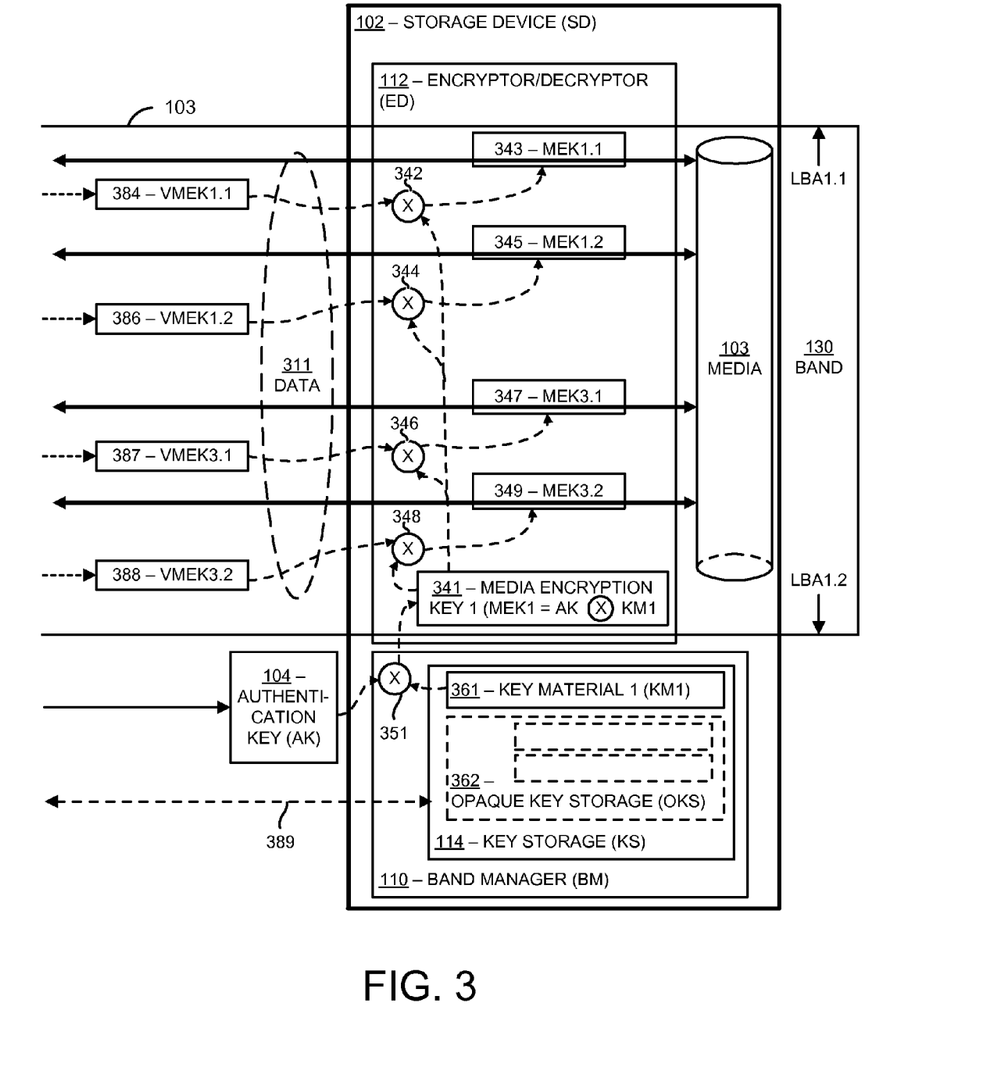
FIG. 3 is a diagram illustrating a storage device portion of the virtual bands concentrator in accordance with an embodiment of the invention.

Referring to FIG. 2, a diagram of the host 105 is shown illustrating a host portion of a virtual bands concentrator in accordance with an embodiment of the invention. Embodiments of the invention are described below using a generic security paradigm which may be used in several security protocols including, but not limited to TCG Enterprise SSC, TCG Opal and ATA security. In various embodiments, self encrypting drives (SEDs) operate on logical block address (LBA) ranges (or data bands). For example, a band 130 having a LBA range of LBA1.1 to LBA1.2 is shown in FIGS. 2 and 3. In various embodiments, the host 105 may run some sort of security application (AP) that authenticates itself with the storage device (SD) 102, using an authentication key (AK) 104.

In a conventional SED, the number of bands is limited, because to maintain data rate, LBA range lookup is often implemented in hardware and hardware tables are limited in size. So conventional SEDs rarely support more than 16 LBA ranges without performance impact. While this figure is quite enough for most applications (e.g., TCG Opal 2.0 asks just for 8 bands), it creates difficulties for the very popular Virtual Machines (VM) environment.

In some embodiments, a single computer can host multiple so-called Virtual Machines (VMs), each of which needs some range of LBAs for respective operations (e.g., FIG. 2 shows three virtual machines, VMs 311, 312, and 313, running on the host 105). From the perspective of each virtual machine 311-313 (e.g., labeled VM-x, x=1, 2, . . . each VM-x might use LBAs from 0 to LBA_MAX(x) where x is the number of the VM. The LBAs used by the VMs are called "Virtual LBAs" (VLBAs) to distinguish them from the real LBAs, known to the storage device 102. The VM Manager (VMM) 120 is responsible for mapping the VLBAs into the real LBAs that the storage device 102 can understand.

Because VMs are created and deleted all the time, allocating a contiguous real LBA range for each vM is not always possible. Instead, a set of bands is allocated, "sliced" arbitrarily out of the real LBA space of the storage device 102. Thus, as shown in the example in FIG. 2, two Virtual Bands (VBs) 320 and 321 of the virtual machine VM-1 are mapped into the single real LBA band 130. In general, the number of real bands is smaller than the number of virtual bands, and in many cases the number of real bands can be significantly smaller than the number of virtual bands. For example, between ten and twenty real bands would be considered a reasonably high number of real bands, while the number of virtual bands needed by a particular application could be in the hundreds, the thousands, or an even greater number. Thus, the number of real data bands and the number of virtual data bands could differ, for example, by one or more orders of magnitude. Each VM 311-313, acting almost as an individual host, can authenticate itself with the storage device 102 with the help of the VBM 122, which performs the translation between the virtual LEAs and the real LBAs, and vice versa. Implementation of the VBM 122 is in accordance with the same security standards as the implementation of the BM 110 of the storage device 102, especially with regard to VKS maintenance and access.

The VBM 122 authenticates the VMs 311-313 and provides the authentication key (AK) 104 and security protocol (e.g., TCG or any other) termination to the storage device (SD) 102. On the host side, the VBM 122 may be configured to support any number of virtual bands (VBs). On the storage device side, the VBM 122 may support only a few real data bands into which the VBM 122 consolidates or concentrates multiple virtual bands as explained below. In many embodiments, the VBM 122 is configured to support just one storage device side (real) data band 130 as shown on the FIG. 2.

In some embodiments, the VBM 122 persistently saves the virtual key storage (VKS) 124 itself, for example, on a separate flash device or EEPROM. The VKS 124 stores virtual key material (VKM) for each virtual band (e.g., virtual key material VKM1.1 381 and VKM1.2 382 are shown in FIG. 2 for VB1.1 and VB1.2, respectively). In other embodiments, the storage device 102 provides a so-called opaque key storage (OKS) 362 (illustrated in FIG. 3) to store the virtual key material. The OKS 362 is called "opaque" because the SD 102 has no knowledge of the virtual bands and, therefore, does not know that the OKS 362 contains any key material. As far as the SD 102 is concerned, the OKS 362 is just another block of data.

Storing the virtual key material in the OKS 362 located in the SD 102 facilitates VM migration from one host to another host. As long as VMM credentials (e.g., the AK 104) are known, the VMM 120 can restore the respective VKS 124 on another host using content 389 from the OKS 362. The SD 102 is oblivious as to the type of information saved in OKS 362. When the VBM 122 changes any of the virtual key materials (e.g., VKM1.1 381, VKM1.2 382, etc.), the entire OKS 362 is rewritten and the old copy is zeroized (e.g., the SD 102 needs to provide this type of service upon a host request).

Referring to FIG. 3, a diagram of the storage device 102 is shown illustrating a storage device portion of a virtual bands concentrator in accordance with an embodiment of the invention. In various embodiments, the SD 102 runs the band manager (BM) application 110, containing the key storage (KS) 114. It is important to keep in mind that when the KS 114 is overwritten, all older copies of the KS 114 need to be sanitized, or zeroized (e.g., the sanitization procedure depends on the type of the storage media 103 and may include, but is not limited to, degaussing of the magnetic media, erasing the flash device, etc.). In some embodiments, the KS 114 contains one sample of key material (KM) 361 for each real data band. A single sample of key material 361 (KM1) for the band 130 is shown in FIG. 3.

A media encryption key (MEK) 341 for each real data band is generated by "wrapping" the AK 104 with the corresponding KM. An example of generating a media encryption key MEK1 by wrapping AK 104 and key material KM1 is shown in FIG. 3. The wrapping operation is illustrated by a multiplier 351. Wrapping is used here in a very generic sense. In some embodiments, the KM 361 is simply the correspondent MEK, encrypted with the AK 104 (e.g., the AK 104 is used as a key encryption key (KEK), so "wrapping" 351 is equivalent to an encryption operation). Encryption/decryption may include, but is not limited to, some version of AES or XTS. In some embodiments, wrapping may include, but is not limited to performing an XOR between the AK 104 and the key material 361 (e.g., KM1 in FIG. 3). However, any operation that does not reduce randomality of the key material 361 may be implemented accordingly to meet the design criteria of a particular application. In multi-band embodiments, respective MEKs (e.g., MEK1, MEK2, . . . , MEKn) are generated for each of n bands by wrapping the AK 104 with the respective key material 361 (e.g., KM1, KM2, . . . , KMn).

In various embodiments, the Encryptor/Decryptor (ED) 112 is implemented as a hardware (HW) module. The ED 112 maintains a table where boundaries of each band (e.g. LBA1.1-LBA1.2 for band 130 shown in FIG. 3) are defined. The MEK 341 for each band is calculated by the wrapping operation 351 based on the AK 104 and correspondent key material 361, then loaded into the ED 112. In these embodiments, when read/write data requests 311 arrive from the host 105, the ED 112 performs a lookup to classify the LBAS of the request to a data band and to select the appropriate MEK 341 (e.g., MEK1 for real band 130). In a conventional SED, read data would be decrypted with the selected MEK, while write data would be encrypted with the selected MEK. In virtual bands concentration embodiments, the selected MEK 341 is not used to encrypt/decrypt data, but rather the selected MEK 341 is used to calculate an actual MEK (e.g., MEK1.1 344, MEK1.2 345, MEK3.1 347, MEK3.2 349, etc.) used for encryption/decryption of each I/O request by wrapping operations 342-348. The wrapping operations 342-348 may be implemented similarly to the wrapping operation 351 (described below).

In various embodiments, the MEK 341 is not sent to the host 105 and (as a good practice) is not stored on the media 103 in plain form. Instead, only key material KM 361 is stored and the authentication key (AK) 104 is needed to recover the MEK 341. Provided that the SD 102 is configured properly, reading or writing data from/to the media 103 is not possible for anyone who does not know the correct credentials.

In some embodiments, a cryptoerase of each individual band is allowed. For example, when a user changes the KM 361 or the VKM 381,382 for a particular band and all old copies of the KM 361 or the VKM 381,382 (even encrypted ones) are sanitized according to the particular media sanitizing rules (e.g., degauss for magnetic media, erase for flash, etc.), the data in the particular band cannot be read anymore by anyone, including anyone knowing the correct credentials. A so-called "Crypto_Erase" function provides a fast, reliable and precise method for data removal and allows for safe storage device reuse.

In virtual band concentration embodiments, the VBM 122 authenticates itself, using the AK 104, with the SD Band Manager (BM) 110. After authentication, the VBM 122 loads the respective VKS 124 either from another device or from the OKS 362. Each of the VMS 311-313 will need to authenticate itself using a respective authentication key (e.g., VM-1 311 authenticates itself using AK1 304, VM-3 313 authenticates itself using AK3 305, an so forth). Respective virtual MEKs (VMEKs) 384, 386, 387, 388 are generated for each Virtual Band (VB) by wrapping (e.g. respective wrapping operations 383, 385, etc.) the respective authentication key AKx with the appropriate virtual key material (e.g., VKM1.1 381, VKM1.2 382, etc.). The corresponding VMEK is attached to each I/O request being sent to the SD 102. The ED 112 wraps the VMEK attached to each I/O request with the MEK 341 for the data band (e.g., MEK1 is used for data band 130 shown in FIGS. 2 and 3), creating individual MEKs (e.g., MEK1.1, MEK1.2, MEK3.1, MEK3.2, etc.) for the particular data operations.

In NVM Express (NVME) host protocol embodiments, a vendor specific read/write could be defined in which a special SGL (Scatter-Gather List) is provided. The SGL contains the VMEK information for each I/O operation. In the SATA protocol, the host may simply append the VMEK to a write command, either by extending the number of sectors in a write and indicating where the key is being provided or transferring larger sectors (e.g., 520 Byte sectors) and putting the key material into the larger sectors themselves. Reading is more difficult to fit into the existing SATA (ACS) protocol. In one example, a vendor unique command may be defined that allows transferring the VMEK with the LBA to be read. In another example, the host may transfer a table of VMEK into a buffer resident in the storage device and use the reserved bits (7 total) to index into the table for the storage device to look up the VMEK quickly on a transfer. This embodiment allows use of existing SATA HW automation in the controllers.

Figure 4:
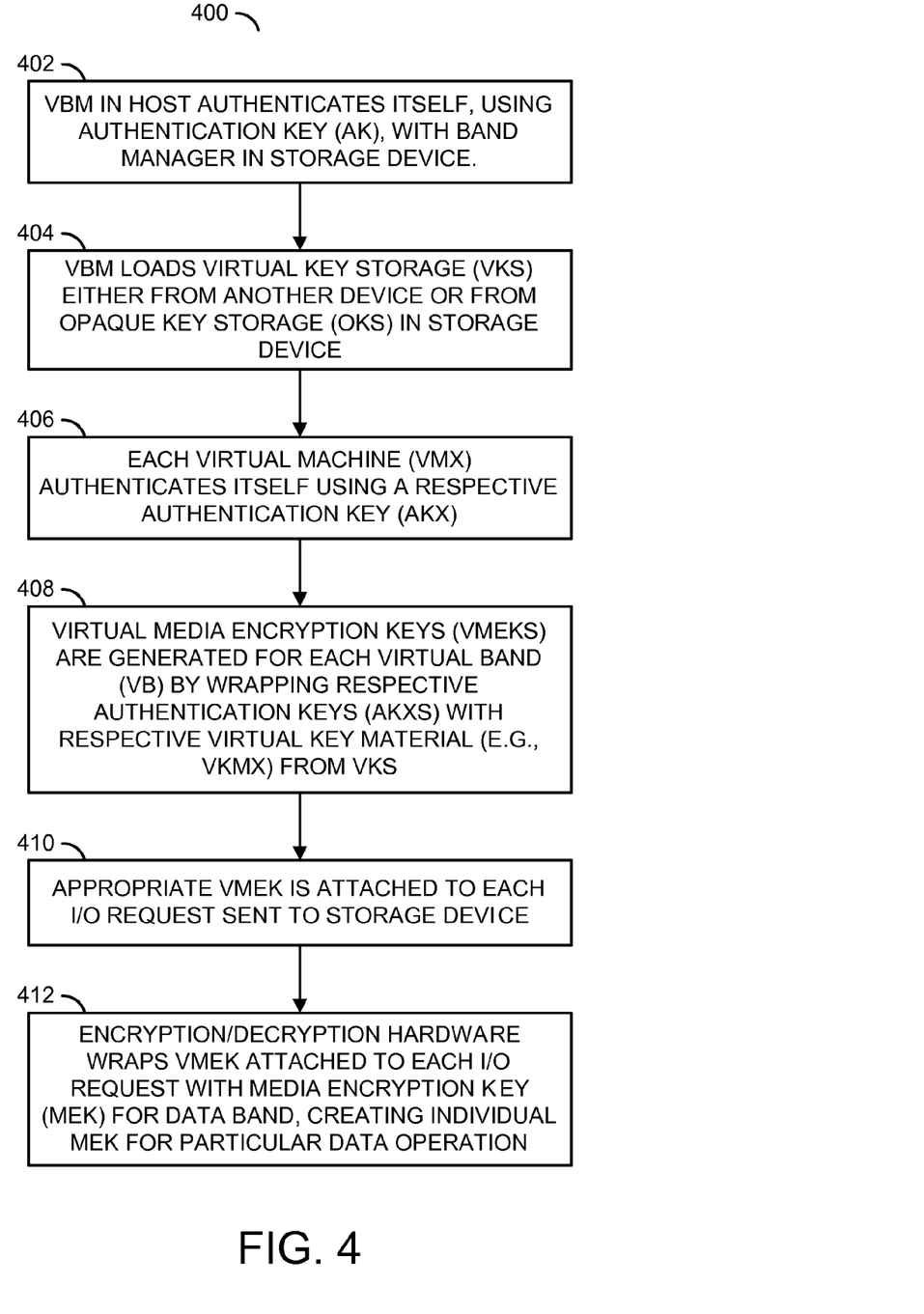
FIG. 4 is a diagram illustrating a process in accordance with an embodiment of the invention.

Referring to FIG. 4, a diagram is shown illustrating an example process 400 in accordance with an embodiment of the invention. In some embodiments, the process (or method) 400 may comprise a step (or state) 402, a step (or state) 404, a step (or state) 406, a step (or state) 408, a step (or state) 410, and a step (or state) 412. In the step 402, the virtual band manager (VBM) 122 in the host 105 authenticates itself using the authentication key (AK) 104 with the band manager (BM) 110 in the storage device 102. In the step 404, VBM 122 loads the virtual key storage (VKS) 124 either from another device or from the opaque key storage (OKS) 362 in the storage device 102. In the step 406, each virtual machine (VMx) authenticates itself using a respective authentication key (AKx). In the step 408, virtual media encryption keys (VMEKs) are generated for each virtual band (VB) by wrapping the respective authentication keys AKx with a respective virtual key material (e.g., VKMx) from the VKS 124. In the step 410, the appropriate VMEK is attached to each I/O request being sent to the storage device 102. In the step 412, the encryption/decryption hardware 112 in the storage device 102 wraps the VMEK attached to each I/O request with the media encryption key (MEK) generated in the storage device 102 for the corresponding data band, creating an individual MEK for the particular data operation.

Figure 5:
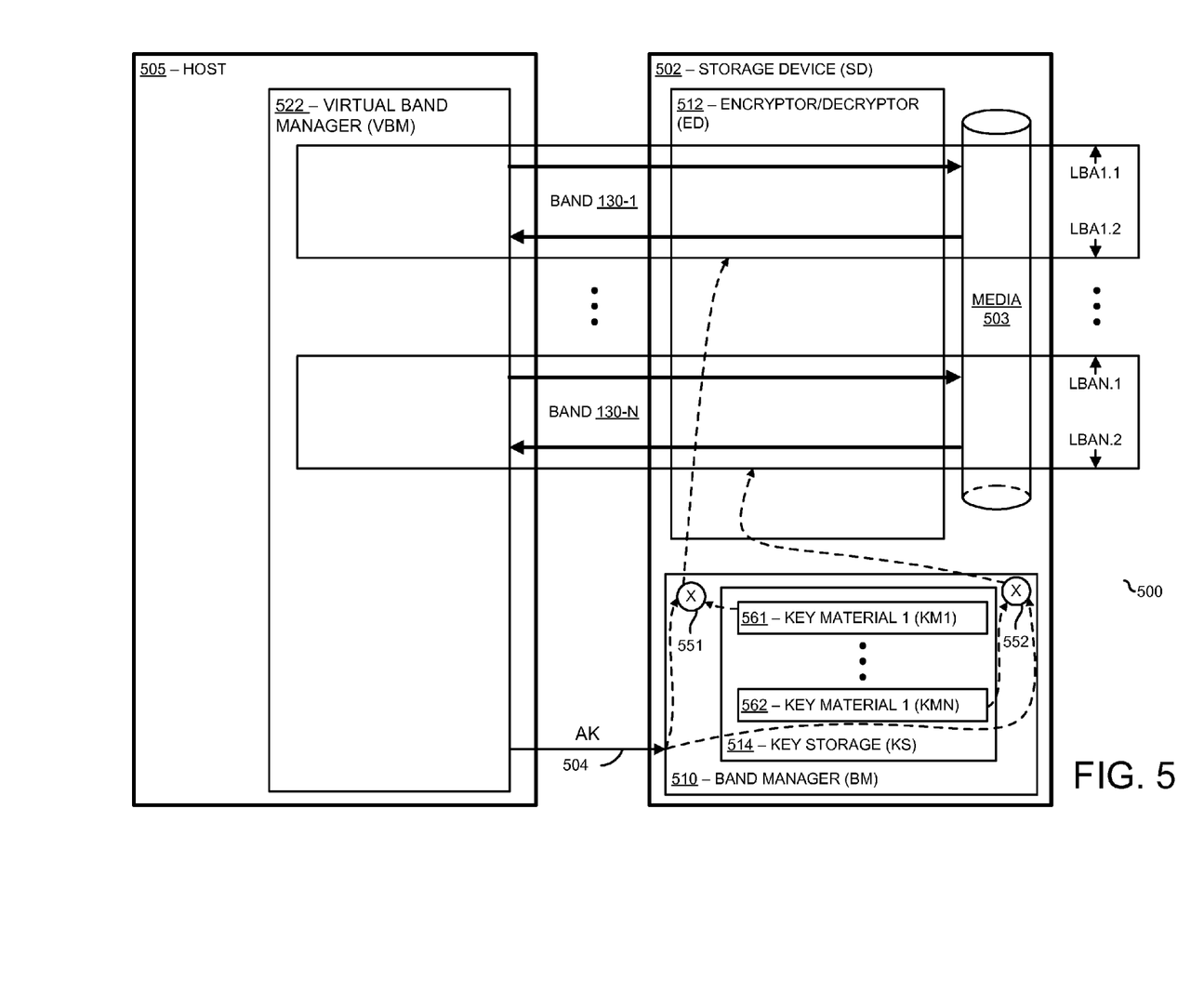
FIG. 5 is a diagram illustrating a virtual band manager with multiple bands in accordance with an embodiment of the invention.

Referring to FIG. 5, a diagram is shown illustrating a system 500 implementing a virtual band manager with multiple real bands in accordance with an embodiment of the invention. The system 500 comprises a storage device 502 with storage media 503 and a host 505. The storage device 502 also includes a band manager (BM) 510 and an encryption/decryption (E/D) block (or circuit) 512 configured to implement a virtual bands concentration scheme in accordance with an embodiment of the invention (described above in connection with FIGS. 2 and 3). The encryption/decryption (E/D) block 512 is configured to handle a number of real bands 130-1 to 130-N. The band manager 510 includes a key storage (KS) 514 that stores key material (e.g., KM1 561 to KMN 562). The key material is used by the storage device 502 in connection with the encryption/decryption of the real bands 130-1 to 130-N (e.g., using respective media encryption keys generated by wrapping operations 551 to 552). The wrapping operations 551 to 552 may be implemented similarly to the wrapping operations 351, 383 and 385 described above in connection with FIGS. 2 and 3).

The host 505 includes a virtual machine manager (VMM) configured to implement a virtual bands concentration scheme in accordance with an embodiment of the invention. The VMM comprises a virtual band manager (VBM) 522. The VBM 522 is configured to manage the plurality of real bands 130-1 to 130-N. The VBM 522 may be configured to operate similarly to the VBM 122 of FIG. 2. The VBM 522 concentrates a plurality of virtual bands (VBs) into the real bands 130-1 to 130-N for storage on the SD 502. The plurality of virtual bands received by the VBM 522 may come from a number of virtual machines (VMs) running on the host 505.

Figure 6:
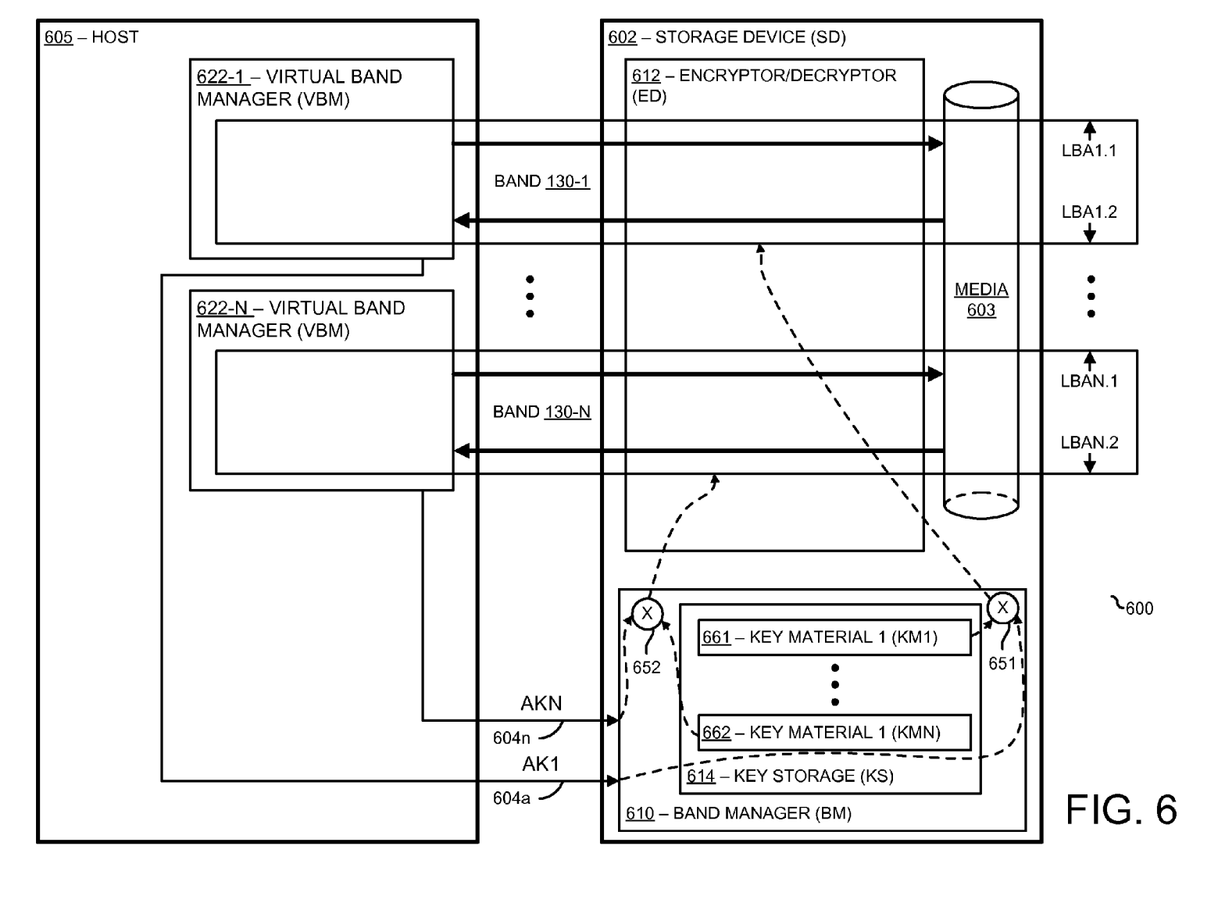
FIG. 6 is a diagram illustrating a host having multiple virtual band managers with one or more bands in accordance with an embodiment of the invention.

Referring FIG. 6, a diagram is shown illustrating a system 600 implementing a host with multiple virtual band managers in accordance with an embodiment of the invention. The system 600 comprises a storage device 602 with storage media 603 and a host 605. The storage device 602 also includes a band manager (BM) 610 and an encryption/decryption (E/D) block (or circuit) 612 configured to implement a virtual bands concentration scheme in accordance with an embodiment of the invention (described above in connection with FIGS. 2 and 3). The encryption/decryption (E/D) block 612 is configured to handle a number of real bands 130-1 to 130-N. The band manager 610 includes a key storage (KS) 614 that stores key material (e.g., KM1 661 to KMN 662). The key material is used by the storage device 602 in connection with encryption/decryption of the real bands 130-1 to 130-N (e.g., using respective media encryption keys generated by wrapping operations 651 to 652). The wrapping operations 651 to 652 may be implemented similarly to the wrapping operations 351, 383 and 385 described above in connection with FIGS. 2 and 3).

The host 605 includes a virtual machine manager (VMM) configured to implement a virtual bands concentration scheme in accordance with an embodiment of the invention. The VMM comprises a plurality of virtual band managers (VBMs) 622-1 to 622-N. The VBMs 622-1 to 622-N are configured to manage the plurality of real bands 130-1 to 130-N. The VBMs 622-1 to 622-N may be configured to operate similarly to the VBM 122 of FIG. 2. The VBMs 622-1 to 622-N concentrate a plurality of virtual bands (VBs) into the real bands 130-1 to 130-N for storage on the SD 602. The plurality of virtual bands received by the VBMs 622-1 to 622-N may come from a number of virtual machines (VMs) running on the host 605.

Each of the VBMs 622-1 to 622-N may concentrate a number of virtual bands into one or more of the real bands 130-1 to 130-N. Each of the VBMs 622-1 to 622-N authenticates itself with a respective authentication key AK1 to AKN. The band manager 610 of the storage device 602 generates the respective media encryption keys for the bands 130-1 to 130-N by wrapping the respective authentication keys AK1 to AKN and the respective key material KM1 661 to KMN 662.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. The term "significantly smaller" is generally meant to communicate the intention that the items compared may differ, for example, by one or more orders of magnitude.

While the invention has been particularly shown and described with reference to embodiments thereof, it will be understood by those skilled in the art that various changes in form and details may be made without departing from the scope of the invention.

The invention claimed is:

1. An apparatus comprising:
a storage medium comprising an opaque key storage; and
a controller coupled to the storage medium, wherein the controller is configured to (i) receive from a host device an authentication key, a plurality of I/O requests, and respective virtual media encryption keys associated with a number of the I/O requests, (ii) allow the host device to access the opaque key storage in response to the authentication key received from the host device being authenticated, (iii) generate a first media encryption key for a real band based upon the authentication key from the host device and key material stored on the apparatus, and (iv) generate a number of second media encryption keys for the number of I/O requests based on the first media encryption key and each of the respective virtual media encryption keys associated with each of the number of I/O requests.

2. The apparatus according to claim 1, wherein:
the number of I/O requests involve portions of a logical block address range of the real band associated with one or more portions of a virtual logical block address range of each of a number of virtual bands of a virtual machine running on the host device; and
the respective virtual media encryption keys for the number of virtual bands are each associated with the particular one of the number of I/O requests involving portions of the logical block address range of the real band associated with the one or more portions of the virtual logical block address range of each of the number of virtual bands.

3. The apparatus according to claim 1, wherein the controller encrypts data associated with write I/O requests using the second media encryption keys prior to writing the data on the storage medium and decrypts data associated with read I/O requests using the second media encryption keys after reading the data from the storage medium.

4. The apparatus according to claim 1, wherein data in the real band is rendered unretrievable by at least one of changing the key material stored on the apparatus, overwriting the opaque key storage, and sanitizing the opaque key storage.

5. The apparatus according to claim 1, wherein the controller is further enabled to sanitize the opaque key storage in response to a request from the host.

6. The apparatus according to claim 5, wherein
sanitizing the opaque key storage comprises at least one of degaussing a portion of a magnetic medium and erasing a portion of a flash memory device.

7. The apparatus according to claim 1, wherein the controller is unaware of the opaque key storage.

8. The apparatus according to claim 1, wherein the apparatus is a self encrypting storage device.

9. The apparatus according to claim 1, wherein the storage medium comprises at least one of a solid state hybrid hard disk drive (SSHD), a hard disk drive (HDD), and a solid-state drive/disk (SSD).

10. A method of securing data for storage on a self encrypting storage device, the method comprising:
enabling a host device to access an opaque key storage of the self encrypting storage device in response to an authentication key received from the host device being authenticated;
loading virtual key material into a virtual key storage of the host device from the opaque key storage of the self encrypting storage device;
generating a respective virtual media encryption key for each of a number of virtual bands based upon an authentication key of a virtual machine running on the host device and the virtual key material stored on the host device;
associating the respective virtual media encryption key for a particular one of the number of virtual bands with I/O requests involving portions of a logical block address range of a real band associated with the particular one of the number of virtual bands; and
encrypting and decrypting data associated with each of the I/O requests using respective media encryption keys based upon the respective virtual media encryption keys associated with each of the I/O requests and an authentication key of the host device.

11. The method according to claim 10, wherein the respective media encryption keys are obtained by:
generating a first media encryption key for the real band based upon the authentication key of the host device and key material stored on the self encrypting storage device; and
generating the respective media encryption keys for the I/O requests involving portions of the logical block address range of the real band associated with the particular one of the number of virtual bands based on the first media encryption key and each of the respective virtual media encryption keys associated with the I/O requests.

12. The method according to claim 10, further comprising:
encrypting data associated with write I/O requests using the respective media encryption keys prior to writing the data on a storage medium; and
decrypting data associated with read I/O requests using the respective media encryption keys after reading the data from the storage medium.

13. The method according to claim 12, wherein the self encrypting storage device comprises at least one of a solid state hybrid hard disk drive (SSHD), a hard disk drive (HDD), and a solid-state drive/disk (SSD).

14. The method according to claim 10, further comprising:
enabling the host device to render data in the real band unretrievable by at least one of changing the key material stored on the self encrypting storage device, overwriting the opaque key storage, and sanitizing the opaque key storage.

15. A system for securely storing data comprising:
a storage medium comprising an opaque key storage;
a controller coupled to the storage medium and configured to encrypt and decrypt user data in a first number of real bands during write and read operations, respectively, wherein a respective first media encryption key is associated with each of the real bands; and a host device configured to communicatively couple to the controller, wherein the host device is further configured to load virtual key material from the opaque key storage of the storage medium into a virtual key storage of the host device, generate a respective virtual media encryption key for each of a second number of virtual bands based upon an authentication key of a respective virtual machine running on the host device and the virtual key material stored in the virtual key storage of the host device, associate the respective virtual media encryption key for a particular one of the second number of virtual bands with the read and write operations involving portions of a logical block address range of the particular one of the first number of real bands associated with the particular one of the second number of virtual bands, and encrypt and decrypt user data from each of the virtual bands in the particular one of the real bands using respective second media encryption keys based on the respective first media encryption key of the particular one of the real bands and respective virtual media encryption keys associated with each of the virtual bands in the particular one of the real bands.

16. The system according to claim 15, wherein the host device comprises a virtual machine manager configured to map the second number of virtual bands to the first number of real bands.

17. The system according to claim 16, wherein the virtual machine manager further comprises one or more virtual band managers configured to map the second number of virtual bands to the first number of real bands.

18. The system according to claim 15, wherein each virtual band is fully protected from a security perspective with unique authentication and encryption keys.

19. The system according to claim 15, wherein migration of a virtual machine from one host device to another host device is facilitated by transferring credentials of the virtual machine from one host device to another host device.

20. The system according to claim 19, wherein restoration of the virtual key storage of one host device on another host device is prevented without the credentials of the virtual machine.

* * * * *